United States Patent [19]
Wang

[11] Patent Number: 5,664,204
[45] Date of Patent: Sep. 2, 1997

[54] APPARATUS AND METHOD FOR SUPPLYING POWER AND WAKE-UP SIGNAL USING HOST PORT'S SIGNAL LINES OF OPPOSITE POLARITIES

[75] Inventor: Lichen Wang, 150 Tennyson Ave., Palo Alto, Calif. 94301

[73] Assignee: Lichen Wang

[21] Appl. No.: 640,310

[22] Filed: Apr. 30, 1996

Related U.S. Application Data

[63] Continuation of Ser. No. 34,018, Mar. 22, 1993, abandoned.

[51] Int. Cl.[6] .................................................. G06F 1/32
[52] U.S. Cl. .............. 395/750.01; 395/882; 395/750.05; 326/62
[58] Field of Search ........................ 326/62, 63, 80; 395/750, 892, 893, 894, 821, 882

[56] References Cited

U.S. PATENT DOCUMENTS

| | | | |
|---|---|---|---|
| 4,148,098 | 4/1979 | McCreight et al. | 364/200 |
| 4,408,291 | 10/1983 | Gunzberg et al. | 364/468.22 |
| 4,440,987 | 4/1984 | Heep et al. | 375/93 |
| 4,607,170 | 8/1986 | Wickman | 307/147 |
| 4,621,170 | 11/1986 | Picandet | 370/284 |
| 4,642,425 | 2/1987 | Guinn, Jr. et al. | 379/57 |
| 4,686,506 | 8/1987 | Farago | 340/347 |
| 4,721,849 | 1/1988 | Davis et al. | 235/472 |
| 4,782,355 | 11/1988 | Sakai et al. | 354/400 |
| 4,884,287 | 11/1989 | Jones et al. | 375/121 |
| 4,965,550 | 10/1990 | Wroblewski | 340/524 |
| 5,157,769 | 10/1992 | Eppley et al. | 395/200 |
| 5,179,710 | 1/1993 | Coschieri | 395/750 |
| 5,260,612 | 11/1993 | Lehmann et al. | 307/475 |
| 5,313,642 | 5/1994 | Seigel | 395/750 |
| 5,343,524 | 8/1994 | Mu et al. | 380/4 |
| 5,402,015 | 3/1995 | Hammerman | 326/75 |
| 5,440,748 | 8/1995 | Sekine et al. | 395/750 |

FOREIGN PATENT DOCUMENTS

| 1151624 | 3/1991 | Japan | G06F 1/00 |
|---|---|---|---|

*Primary Examiner*—Thomas C. Lee
*Assistant Examiner*—D. Dinh
*Attorney, Agent, or Firm*—Skjerven, Morrill, MacPherson, Franklin & Friel; Edward C. Kwok

[57] ABSTRACT

An apparatus and a method for using a host port to provide power to a level converter for voltage level conversion between a CMOS based palm-top computer and RS-232 host processor are disclosed. Energy from the host RS-232 port is extracted by the level converter from the request-to-send line (−12 V) and the data-terminal-ready line (+12 V). The host port request-to-send line may also be used to send a wake-up signal to turn on the palm-top computer. A momentary (1 millisecond) transition in the request-to-send line of the host port causes the level converter to present an appropriate signal on the wake-up pin of the palm-top computer.

19 Claims, 4 Drawing Sheets

| COMPONENT | RATING | COMPONENT | RATING |
|---|---|---|---|
| 301 | MC 145406 | 312 | 0.1 μF |
| 302 | 1.8 KΩ | 313 | 0.1 μF |
| 303 | MC 145406 | 314 | 5 V 0.5 W (Zener) |
| 304 | 10 KΩ | | |
| 305 | BAV70 | 315 | BAV70 |
| 306 | MC 145406 | 316 | BAV70 |
| 307 | MC 145406 | 317 | 10 KΩ |
| 308 | BAV70 | 318 | BAV70 |
| 309 | 100 KΩ | 319 | 78L05 |
| 310 | BAV70 | 320 | BAV70 |
| 311 | 10 μF | 322 | wire jumper |

APPARATUS AND METHOD FOR SUPPLYING POWER AND WAKE-UP SIGNAL USING HOST PORT'S SIGNAL LINES OF OPPOSITE POLARITIES

This application is a continuation of application Ser. No. 08/034,018, filed Mar. 22, 1993 now abandoned.

BACKGROUND OF THE INVENTIOIN

1. Field of the Invention

This invention relates to communication devices for communication between a host processor and a pocket sized electronic device. More particularly, this invention relates to use of a standard port in the host processor for providing power to a level converter for voltage level conversion necessary for communicating with a palm-top computer and for providing a wake-up signal to turn on the palm-top computer.

2. Discussion of the Related Art Including Information Disclosed Under 37 CFR §§ 1.97–1.99

Pocket sized electronic devices such as palm-top computers have proliferated in the last few years. Most pocket devices are CMOS devices using signals levels of 5 volts and 0 volts. Such pocket devices typically use battery based power supplies. One such pocket device is the WIZARD palm-top computer. Technical information about the WIZARD is available from Sharp Electronics Corporation, Sharp Plaza, Mahway, N.J. 07430-2135.

Pocket devices may transmit and receive data serially via a single data communication port. Data communication ports of pocket devices are usually different from the industry standard RS-232 because of the power requirements to meet the RS-232 specification. This is because pocket devices being CMOS based (such as WIZARD) support only signals of 5 V and 0 V. On the other hand, the RS-232 specification requires signals of ±12 V. In order for such pocket devices to communicate with host processors, a level converter is needed. Level converters for pocket devices convert signals from the 0–5 V to ±12 V and vice versa.

In the past, level converters have been powered from external +12 V and −12 V power sources. However, external power sources may not be necessary if the requisite power can be drawn from a standard port of the host processor. Small peripheral devices such as the mouse draw power from the transmit data (TxD) line and data terminal ready (DTR) line of an industry standard RS-232 port. Although a host port can power small devices, host ports as power sources have the drawback in that power supply fluctuates depending on data transfer activity (TxD line of RS-232 port fluctuates between ±12 V when data is transmitted on the line).

Since pocket devices are usually battery based, turning off the pocket device when not in use avoids draining the battery. Thus pocket devices are frequently turned on only for the limited time during which data transfer takes place. In the past, once the pocket device was turned off, user intervention was needed to turn it back on again.

Automatic on-off switching by the level converter avoids cumbersome manual switches and the possibility of a user forgetting to switch off the pocket device. Although in the past it was possible for a pocket device connected to an always on modem to be automatically switched on and off by the modem, the automatic on-off feature was not supported by level converters. This is because in modems the wake-up pin of the pocket device can be driven by a carrier detect signal not available in level converters. Therefore, for level converters, user intervention was necessary to turn on the pocket device after the data transmission was completed and the pocket device turned off in the previous session.

Even for modems, the wake-up feature was not easy to use. In order to take advantage of the wake-up feature, the modem must be powered on and waiting for the phone call from the remote host processor. Furthermore, in order to power off, the remote host processor had to send a shut-down message and disconnect the phone at precisely the same time. If the phone was disconnected too early, the pocket device did not receive the shut-down message. If the phone was disconnected too late, the pocket device powered up again due to the presence of the carrier detect signal on the wake-up pin.

SUMMARY OF THE INVENTION

A level converter cable according to this invention interfaces the communication port of a pocket device with a communication port of a host processor. Such a level converter cable supports data communications by providing level conversion as well as automatic on-off switching features in a single unit.

The level converter cable includes a host connector, a shielded cable, a shielded box, and a pocket device connector. The shielded box contains a level converter circuit which converts the voltage levels of the host port signals into the voltage levels of the pocket device port signals and vice versa. The level converter circuit draws power from the lines of the host port. In one embodiment, the level converter circuit draws power from the request to send (RTS) line (−12 V) as well as the data terminal ready (DTR) line (+12 V) of an industry standard RS-232 port of the host processor. A power supply based on RTS and DTR lines provides a power supply of high noise immunity irrespective of the state of data transfer.

This level converter circuit is also responsive to a wake-up message from the host processor on a control line of the host port. In one embodiment, the level converter circuit is responsive to a momentary (1 millisecond) transition in the RTS line of an industry standard RS-232 port. Such a wake-up message causes the level converter circuit to transmit a transition in voltage levels on the appropriate line of the pocket device's communication port. The pocket device may be shut down by the host processor sending a shut-down message after completion of data transmission.

DESCRIPTION OF THE PREFERRED EMBODIMENT(S)

Figure 1:
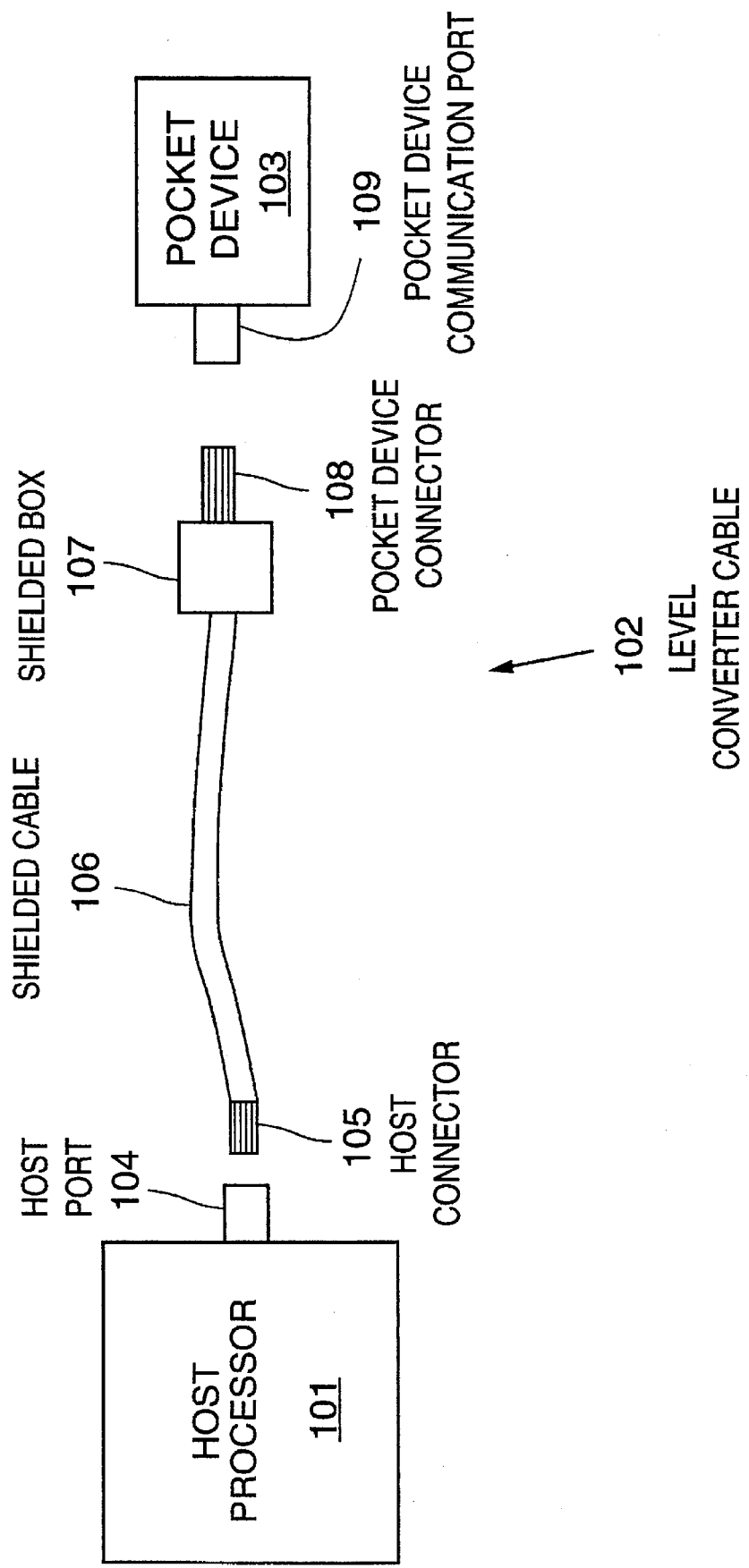
FIG. 1 shows an illustrative diagram of the host processor, the level converter cable, and the pocket device.

As shown in FIG. 1, a host processor 101 is shown here with a level converter cable 102 and a pocket device 103.

Host processor 101 can be connected to pocket device 103 by level converter cable 102. In one embodiment, host processor 101 is a personal computer such as an IBM PC and pocket device 103 is a palm-top computer such as the WIZARD.

Host processor 101 has a host port 104. In one embodiment, host port 104 is an industry standard RS-232 port of 25 pins. Alternatively, host port 104 may also be an industry standard RS-232 port of 9 pins. In either 25 pin or 9 pin RS-232 port, the signals supported are ±12 V.

Pocket device 103 has a pocket device communication port 109. In one embodiment, pocket device communication port 109 is a 15 pin port of the WIZARD palm-top computer. In the 15 pin pocket device communication port 109, the signals supported are 5 V and 0 V because pocket device 103 is a CMOS device.

In order for host processor 101 to communicate with pocket device 103, a level converter cable 102 is shown in FIG. 1. Level converter cable 102 converts signals from the 0–5 V to ±12 V and vice versa. Level converter cable 102 draws power from the request to send (RTS) line (–12 V) as well as the data terminal ready (DTR) line (+12 V) of host port 104.

Level converter cable 102 includes a host connector 105, a shielded cable 106, a shielded box 107, and a pocket device connector 108. Host connector 105 connects to host port 104. Host connector 105 is an industry standard RS-232 pin connector of either 25 pins or 9 pins. Pocket device connector 108 connects to pocket device communication port 109. In one embodiment, pocket device connector 108 is a 15 pin connector that connects to a 15 pin port of the WIZARD palm-top computer.

Figure 2:
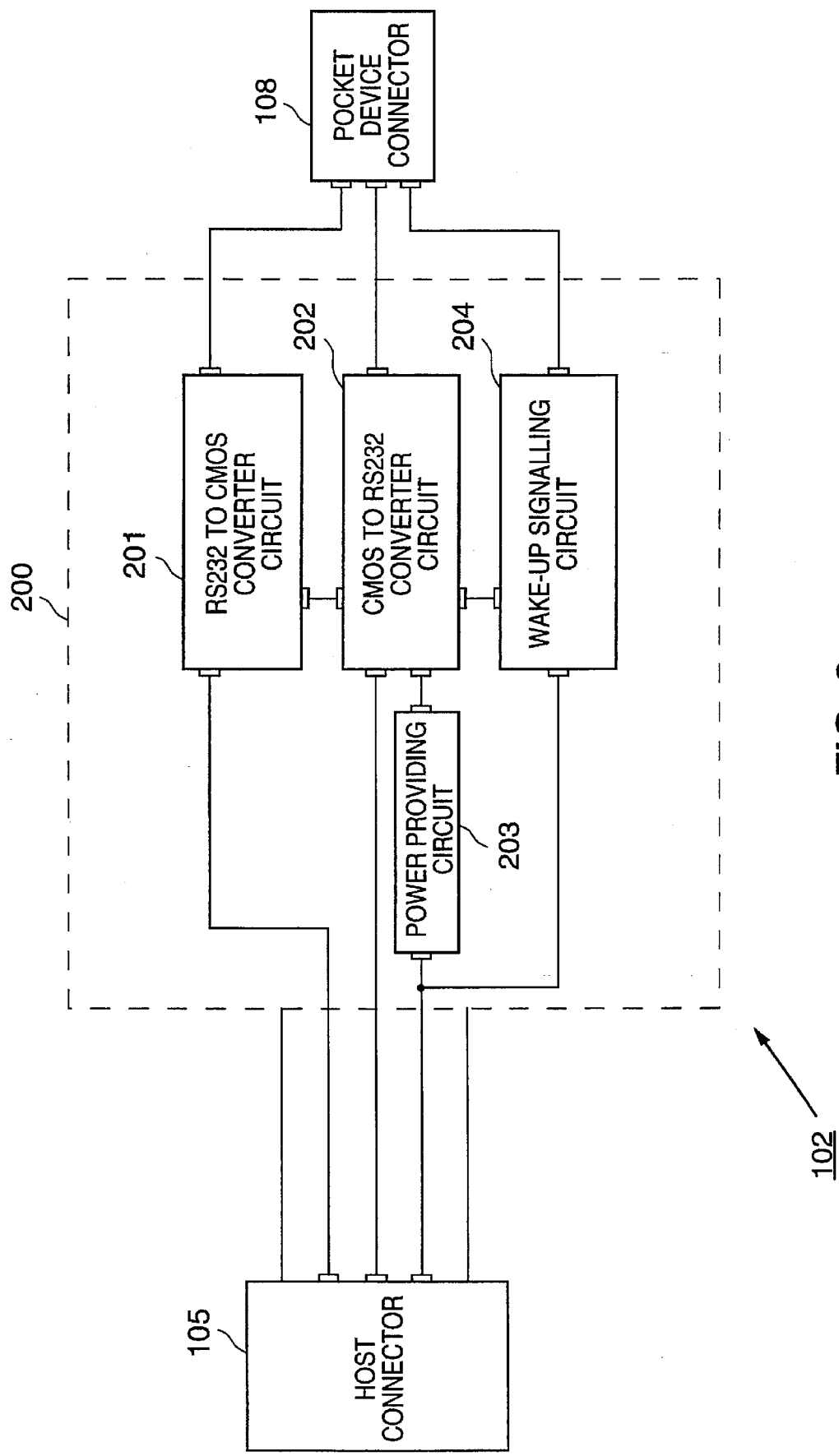
FIG. 2 shows an illustrative block diagram of the level converter circuit inside the shielded box of the level converter cable of FIG. 1.

FIG. 2 shows a block diagram of the level converter circuit 200 inside shielded box 107 of level converter cable 102 of FIG. 1. Level converter circuit 200 of level converter cable 102 includes RS-232 to CMOS level converter circuit 201, CMOS to RS-232 level converter circuit 202, a wake-up signalling circuit 204 and a power providing circuit 203.

A power providing circuit 203 supplies power to the various components of level converter circuit 200. Power providing circuit 203 draws power from host port 104 (of FIG. 1) via host connector 105. Host connector 105 includes a request-to-send line and a data-terminal-ready line which are used as a power source by the power providing circuit 203. Power providing circuit 203 supplies power to the CMOS to RS-232 conversion circuit 202 and the RS-232 to CMOS conversion circuit 201.

A wake-up signalling circuit 204 supports the wake-up feature of level converter circuit 200. Pocket device connector 108 includes a wake-up pin used to receive a one millisecond voltage transition signal that causes the pocket device to wake up. Wake-up signalling circuit 204 converts a momentary ±12 volt transition on the request-to-send line of host connector 105 into a wake-up signal on the wake-up pin of the pocket device connector 108.

Figure 3:
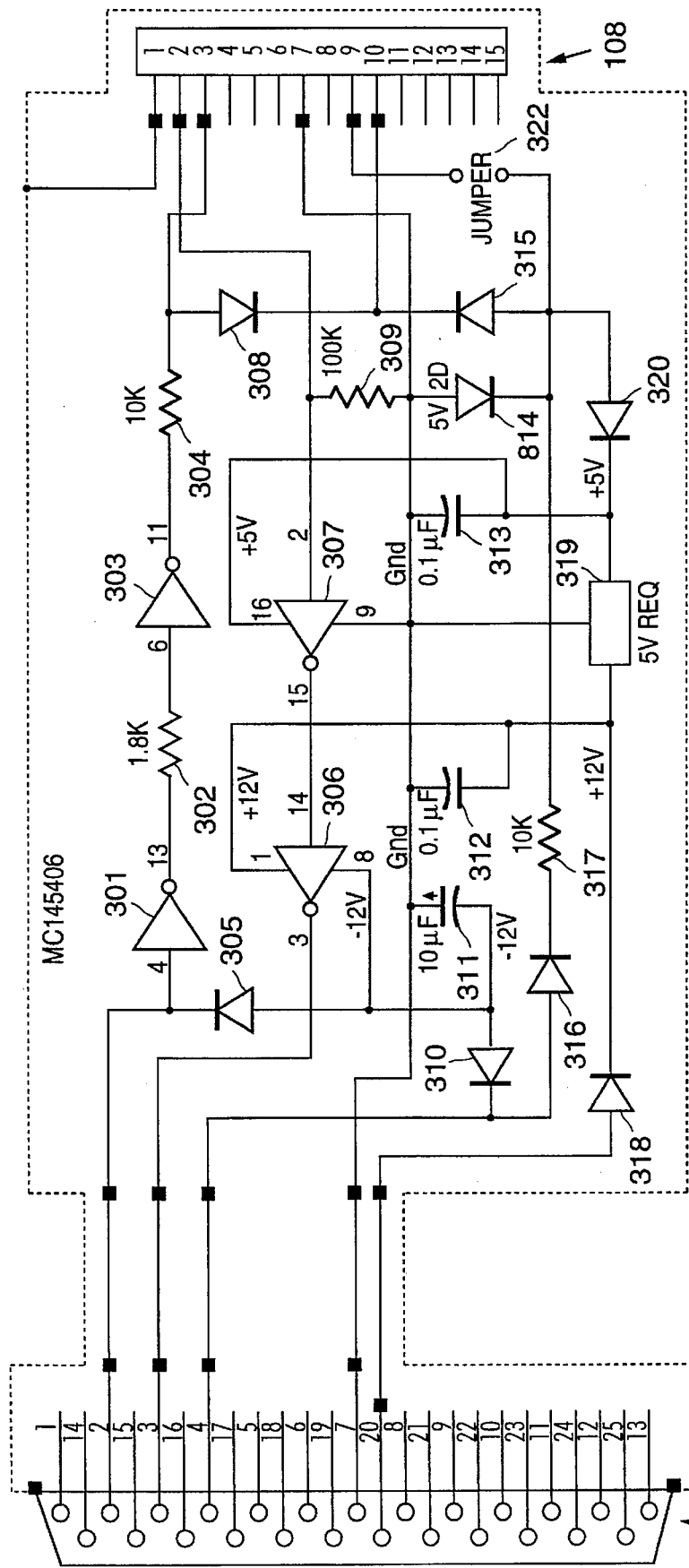
FIG. 3 illustrates an embodiment of the level converter circuit of FIG. 2.
Figures 4, 5:
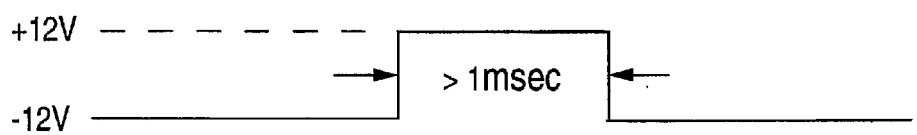
FIG. 4 is a table of the illustrative values of components shown in FIG. 3.
FIG. 5 is an illustrative timing diagram for a momentary voltage transition on the RTS line of the RS-232 port indicating a "wake-up" signal from the host processor to the pocket device.

FIG. 3 shows in detail one embodiment of the level converter in accordance with this invention. Illustrative ratings for the components of FIG. 3 are shown in FIG. 4.

In FIG. 3, host connector 105 is a RS-232 pin connector with 25 pins. Pin 2 of host connector 105 is the transmit data (TxD) pin. Normally, the TxD signal is at –12 V when no data is being transmitted. However, when the host processor sends 0's or the "break" signal, the TxD signal is at +12 V. Therefore the TxD signal fluctuates between ±12 V depending on data sent in the data transmission. Pin 3 of host connector 105 is the receive data (RxD) pin. Normally, the RxD signal fluctuates between ±12 V depending on data sent during data transmission. Pin 4 of host connector 105 is the request-to-send (RTS) pin. Conventionally, the RTS signal is high at +12 V. Pin 7 of host connector 105 is the ground (GND) pin. The GND pin is usually at 0 V. Pin 20 of host connector 105 is the data-terminal-ready (DTR) pin. The DTR signal is usually high at +12 V. A well known feature of communication software in host processors with RS-232 ports is the ability to set the voltage levels in the individual pins. Accordingly, in order to achieve the benefit of noise immunity, the signal on the RTS pin (pin 4) is set by the host processor's software to –12 V during operation. Furthermore, the host processor's software may send a wake-up signal to the pocket device by causing a transition on the RTS signal from –12 V to +12 V, holding it momentarily (1 millisecond) at +12 V and then going back to –12 V for normal operation. Finally, the host processor's software may turn off the pocket device by sending a shut-down message to communication software in the pocket device after completion of data transmission. Although the host processor's software required to set RTS pin 4 to –12 V and to cause the momentary transition wake-up signal have not been described, such software can be provided by modifying a conventional communication software in the host processor. The modification technique is within the ordinary skill in the art. Also, it is within the ordinary skill to modify the conventional communication software in the host processor to send a shut-down message to communication software of the pocket device.

Pocket device connector 108 is a proprietary 15 pin connector for the WIZARD palm-top computer. Technical information about the WIZARD is available from Sharp Electronics Corporation, Sharp Plaza, Mahway, N.J. 07430-2135. Pin 1 of pocket device connector 108 is a shield pin for protective ground connection inside the pocket device. Normally pin 1 of pocket device connector 108 is at 0 V. Pin 2 of pocket device connector 108 is the transmit data (TxD) pin. Normally the TxD signal from the pocket device fluctuates between 0 V and 5 V depending on the data transmitted. Pin 3 of pocket device connector 108 is the receive data (RxD) pin. Normally the RxD signal on pin 3 of the pocket device fluctuates between 0 V and 5 V depending on the data transmitted. Pin 7 of the pocket device connector 108 is the ground (GND) pin. The GND pin 7 of the pocket device connector 108 is normally at 0 V. Pin 9 of pocket device connector 108 is a pin responds to a wake-up signal. The voltage level of the wake-up signal on pin 9 of pocket device connector 108 is required to be no more than 5 V. Pin 10 of pocket device connector 108 indicates the voltage of the battery in the pocket device. The voltage level on pin 10 of pocket device port is normally at 5 V.

RS-232 data pulses (±12 V signals) from the host port sent on TxD pin 2 of host connector 105 are converted to CMOS data pulses (0–5 V signals) by the level converter before being presented to the pocket device port. In the level converter, the transmit data (TxD) pin 2 of host connector 105 is connected to input 4 of inverting buffer 301. Inverting buffer 301 is one of six inverting buffers of MC 145406. MC 145406 is a Motorola CMOS/RS-232 level converter containing three CMOS to RS-232 buffers and three RS-232 to CMOS buffer. Only four of these inverting buffers are used in the level converter circuit. The four buffers used are shown in FIG. 3 as 301, 303, 306 and 307.

Output terminal 13 of inverting buffer 301 is connected via a 1.8 K resistor 302 to input terminal 6 of inverting buffer 303. Therefore, the data pulses from the TxD pin 2 of host connector 105 are inverted by inverting buffer 301 and the output current of inverter 301 is limited by resistor 302. The data pulses are again inverted by inverting buffer 303. Output 11 of inverting buffer 303 is connected to one end of a 10 K resistor 304. The other end of resistor 304 is connected to receive data pin (RxD) 3 of pocket device connector 108 as well as to the anode of diode 308. Since the data pulses from the host processor can have fast transitions, the data pulses are slowed down by resistors 302 and 304, taking advantage of stray capacitance in the electrical nodes, before being sent to the RxD pin 3 of pocket device connector 108. Resistors 302 and 304 are used to limit the current. The unnecessary fast transitions can in some instances, if not slowed down, lead to signal ringing and excessive radio frequency noise emission. Signal ringing may be passed through to the pocket device as multiple signal transitions. Diode 308 serves to ensure that the signal presented is no more than the battery voltage shown at battery voltage pin 10 of pocket device connector 108. The signal at pin 10 is not more than 5 volts because the cathode of diode 308 is connected to battery voltage pin 10 of pocket device connector 108.

CMOS data pulses (0–5 V signals) from the pocket device port sent on TxD pin 2 of pocket device connector 108 are converted to RS-232 data pulses (±12 V signals) by the level converter before being presented to the host port. Inside the level converter, the data signal from TxD pin 2 of pocket device connector 108 is inverted by inverting buffer 307. TxD pin 2 of the pocket device connector 108 is also connected to one end of 100 K resistor 309. The other end of 100 K resistor 309 is connected to ground. Resistor 309 ensures that when the pocket device is not connected, the input to inverting buffer 307 is at 0 V. Ground is provided from pin 7 of host connector 105 and from pin 7 of pocket device connector 108. Output 15 of inverting buffer 307 is connected to input 14 of inverting buffer 306. Therefore the data pulses are again inverted by buffer 306. Output 3 of inverting buffer 306 is connected to receive data (RxD) pin 3 of host connector 105.

As discussed earlier, software in the host processor sets the request-to-send (RTS) pin 4 of host connector 105 to −12 V during normal operation. This is a source of power for the level converter. For example, inverting buffer 306 is powered from power drawn from the RTS pin 4 (−12 V) (and DTR pin 20 (+12 V)) of host connector 105. RTS pin 4 is connected to the cathode of diode 310. The anode of diode 310 is connected to the negative terminal of 10 μF capacitor 311. Positive terminal of capacitor 311 is connected to ground. The −12 V power input 8 of inverting buffer 306 is connected to the anode of diode 305. The anode of diode 310 is also connected to the anode of diode 305. The cathode of diode 305 is connected to transmit data pin 2 of host connector 105. Diode 305 allows the TxD pin to supply −12 V power via the power providing circuit to buffer 306. The use of the TxD pin to supply −12 V power is provided for compatibility with systems that do not set the RTS line of the host RS-232 port to −12 V.

The RTS pin 4 of host connector 105 also serves to send the wake-up signal from the host processor. Automatic operation of the wake-up signal performed via the RS-232 pins and the line converter obviates the need for a separate line just for power supply switching of the pocket device. As discussed earlier, in order to power up the pocket device, the host processor sends a voltage transition on RTS pin 4 of the host connector 105. RTS pin 4 of host connector 105 transitions from −12 V to +12 V and remains there for 1 millisecond and then transitions back to −12 V.

Inside the level converter, RTS pin 4 of host connector 105 is connected to the anode of diode 316. The cathode of diode 316 is connected to one end of 10 K resistor 317. Therefore the wake-up signal from the host processor is stepped down by resistor 317. Other end of resistor 317 is connected to the cathode of 5 V zener diode 314. The anode of zener diode 314 is connected to ground. The cathode of zener diode 314 is also connected to the anode of diode 315. Resistor 317 and Zener diode 314 act to step down the voltage from +12 V to +5 V. Diode 315 clamps the voltage to not go above the battery voltage pin 10 of pocket device connector 108. The cathode of diode 315 is connected to battery voltage pin 10 of pocket device connector 108. The anode of diode 315 is also connected to one end of a jumper. The other end of the jumper is connected to wake-up pin 9 of pocket device connector 108. The jumper is usually shorted to enable the wake-up feature. As a user option, if the jumper is removed then the wake-up feature is disabled.

As noted earlier, RTS pin 4 of host connector 105 is also connected to the cathode of diode 310 in order to supply power to the power providing circuit. The power providing circuit is shielded from the wake-up signal on RTS pin 4 of host connector 105 by diode 310. Moreover, capacitor 311 ensures that there is no fluctuation in −12 V power supply of buffer 306, when the RTS signal transitions to +12 V. The −12 V power source for the level converter is also shielded from fluctuations in the RTS signal so that the host does not receive extraneous signals when the pocket device is not sending data. Also, the TxD pin 2 of host connector 105 helps supply the −12 V power via diode 305 whenever the TxD pin is at −12 V.

The data terminal ready (DTR) pin 20 of host connector 105 provides the +12 V for the level converter's power supply. For example, inverting buffer 307 is powered from the DTR pin 20 of the host connector 105 via regulator 319 (+5 V). Inside the level converter, DTR pin 20 of host connector 105 is connected to the anode of diode 318. The cathode of diode 318 is connected to the positive terminal of 0.1 μF capacitor 312. Negative terminal of capacitor 312 is connected to ground. The cathode of diode 318 is also connected to the +12 V power input 1 of inverting buffer 306. The cathode of diode 318 is also connected to the +12 V terminal of 5 V regulator 319. 5 V regulator 319 is a 78L05 from National Semiconductor Corporation, Santa Clara, Calif. Ground terminal of regulator 319 is connected to ground. The +5 V terminal of regulator 319 is connected to positive terminal of 0.1 μF capacitor 313. Negative terminal of capacitor 313 is connected to ground. An output terminal of regulator 319 is also connected to the +5 V power input 16 of inverting buffer 307. The 0 V power input 9 of inverting buffer 307 is connected to ground. The +5 V terminal of regulator 319 is also connected to the cathode of diode 320. The anode of diode 320 is connected to the anode of diode 315. Diode 320 ensures that the voltage presented to wake-up pin 9 of pocket device connector 108 is no higher than the battery voltage level of pin 10 of pocket device connector 108.

Capacitors 312 and 313 of the level converter form low pass filters to avoid spikes in the power supply to buffers 306 and 307 caused by power fluctuations in the level converter. Capacitor 311 acts as a power supply.

The inverting buffers 301, 303, 306 and 307 are each powered by the same +12, −12, 5 V power pins and the ground pin since they are all on the same chip, MC 145406.

A level converter in accordance with the above description has numerous advantages. For example, no external +12 V and −12 V power sources are necessary for the level converter. Moreover, since the level converter does not use the transmit data (TxD) line of the RS-232 port as a primary power source, power supply of the level converter enjoys a high noise immunity. Additionally, hardware in the level converter shields fluctuations in the signal from the RS-232 port when the pocket device is not sending data and therefore this function need not be supported by the host software.

The automatic on-off feature supported by the level converter permits the host processor to turn off the pocket device when not in use, thus avoiding battery drain. Also, once the pocket device is turned off, no user intervention is needed to turn it back on again. The level converter also avoids the drawbacks of prior art modems such as remaining on all the time, requiring precise timing of shut-down message etc. This is because the level converter permits the host processor to have complete control of the pocket device via the automatic on-off switching feature. Automatic on-off switching of the pocket device is supported by the level converter irrespective of any significant timing constraints.

The description of an embodiment of this invention is intended to be illustrative and not limiting. Numerous modifications and variations of this invention will be apparent to those skilled in the art, all of which are included within the broad scope of this invention. For example, instead of the DB-25 and DB-9 connectors, the RS-232 port may be the DIN-8 connector for connecting a pocket device to an Apple Macintosh host. Moreover, instead of an RTS pin of the RS-232 standard, it is possible to use another pin such as data set ready (DSR). Also, instead of the RS-232 standard, other asynchronous communication interface may be used such as the industry standard PCMCIA. Furthermore, the apparatus and method according to this invention are not confined to the WIZARD palm-top computer. They can be used in any pocket device that contains a wake-up pin for turning on the pocket device.

We claim:

1. An apparatus for connecting a pocket device to a host processor for data communication, said apparatus comprising:

a host connector that connects to a host port of said host processor, said host port comprising a first signal line, carrying a signal at a substantially constant first voltage, and a second signal line, carrying a signal at a substantially constant second voltage opposite in polarity to said first voltage;

a level conversion circuit electrically connected to said host connector, said level conversion circuit drawing power at said substantially constant first voltage and at said substantially constant second voltage from said first and second signal lines at all times during operation; and a pocket device connector that connects to a port of said pocket device, said pocket device connector being electrically connected to said level conversion circuit.

2. An apparatus for connecting a pocket device to a host processor for data communication, said apparatus comprising:

a host connector that connects to a host port of said host processor, said host port comprising a first signal line at a substantially constant first voltage and a second signal line at a substantially constant second voltage, wherein said host port carries a plurality of signals including said first signal and said second signal and substantially all of said plurality of signals are in accordance with a predetermined signal interface except for said second signal and further wherein said second signal is opposite in polarity to a signal normally carried on said second signal line in accordance with said predetermined signal interface;

a level conversion circuit electrically connected to said host connector, said level conversion circuit drawing power at said first voltage from said first signal line and at said second voltage from said second signal line at all times during operation; and a pocket device connector that connects to a port of said pocket device, said pocket device connector being electrically connected to said level conversion circuit.

3. The apparatus of claim 1 wherein the level conversion circuit converts data pulses between the voltage levels of said host processor and the voltage levels of said pocket device.

4. The apparatus of claim 1 wherein said host port is a RS-232 port and said first signal line is a data terminal ready line and said second signal line is a request to send line.

5. The apparatus of claim 1 further comprising a cable for electrically connecting said host connector to said level conversion circuit.

6. The apparatus of claim 5 wherein said cable is shielded.

7. The apparatus of claim 1 wherein said level conversion circuit is shielded by a box.

8. The apparatus of claim 1 wherein said level conversion circuit comprises a low pass filter.

9. The apparatus of claim 1 wherein said level conversion circuit comprises a plurality of inverting buffers.

10. The apparatus of claim 1 wherein said level conversion circuit comprises a RS-232 to CMOS conversion circuit, a CMOS to RS-232 conversion circuit and a power providing circuit.

11. The apparatus of claim 10 wherein said CMOS to RS-232 conversion circuit comprises a plurality of diodes, a plurality of capacitors and a plurality of inverting buffers.

12. The apparatus of claim 10 wherein said RS-232 to CMOS conversion circuit comprises a plurality of diodes, a plurality of inverting buffers and a plurality of resistors.

13. An apparatus for connecting a pocket device to a host processor for data communication, said apparatus comprising:

a host connector that connects to a host port of said host processor, said host port comprising a control signal line carrying a signal at a substantially constant first voltage except for a momentary voltage transition, wherein said host processor causes said momentary voltage transition on said first control signal line in order to switch on said pocket device;

a pocket device connector that connects to a pocket device communication port of said pocket device, said pocket device communication port comprising a wake-up pin, wherein said pocket device switches on in response to a momentary voltage transition in the voltage level on said wake-up pin; and a level conversion circuit electrically connected between said host connector and said pocket device connector, said level conversion circuit deriving power from said control line at all times during operation, said level conversion circuit causing a momentary voltage transition on said wake-up pin on receipt of said momentary voltage transition on said control signal line.

14. The apparatus of claim 13 wherein said control signal line is at a voltage between ±12 volts and said wake-up pin is at a voltage between 0 volts and 5 volts.

15. The apparatus of claim 14 wherein said control signal line is maintained by software in said host at a substantially steady voltage opposite to the voltage of a first signal line whenever said control signal line is not being used to switch on said pocket device.

16. An apparatus for connecting a pocket device to a host processor for data communication, said apparatus comprising:

a host connector that connects to a host port of said host processor, said host port comprising a first signal line carrying a first signal at a substantially constant first voltage and a second signal line carrying a second signal at a substantially constant second voltage, wherein said host port carries a plurality of signals including said first signal and said second signal and substantially all of said plurality of signals are in accordance with a predetermined signal interface except for said second signal and further wherein said second signal is opposite in polarity to a signal normally carried on said second signal line in accordance with said predetermined signal interface;

a level conversion circuit connected to said host connector, said level conversion circuit drawing power at a first voltage from said first signal line and at a second voltage from said second signal line at all times during operation; and a pocket device connector that connects to a port of said pocket device, said pocket device connector being connected to said level conversion circuit.

17. An apparatus for connecting a pocket device to a host processor for data communication, said apparatus comprising:

a host connector that connects to a host port of said host processor, said host port comprising a control signal line, said host processor causing a momentary voltage transition on said control signal line as a command to said pocket device to power on said pocket device;

a pocket device connector that connects to a pocket device communication port of said pocket device, said pocket device communication port comprising a wake-up pin, wherein said pocket device switches on in response to a momentary voltage transition in the voltage level on said wake-up pin; and signalling means electrically coupling a group of lines of said host connector and to a group of pins of said pocket device connector, said signalling means deriving power from said control signal line at all times during operation, said signalling means causing a momentary voltage transition on said wake-up pin in response to a momentary voltage transition on said control signal line.

18. A method for connection of a pocket device to a host processor for data communication, said method comprising the steps of:

causing software in said host processor to maintain a second signal line of a host port at a substantially steady second voltage opposite to a first voltage of a first signal line of said host port;

using power at a first voltage from said first signal line and at said second voltage from said second signal line at all times during operation to cause a level converter to convert data pulses between the voltage levels of said pocket device and the voltage levels of said host processor.

19. A method for connection of a pocket device to a host processor for data communication, said method comprising the steps of:

using power at a first voltage from a first signal line and at a second voltage from a second signal line at all times during operation to cause a level converter to convert data pulses between the voltage levels of said pocket device and the voltage levels of said host processor;

transforming a momentary transition in the voltage level of said first signal line from the voltage level of said host processor to the voltage level of said pocket device; and transmitting said transformed momentary transition to a wake-up pin of a communication port of said pocket device.

* * * * *